UNITED STATES PATENT OFFICE.

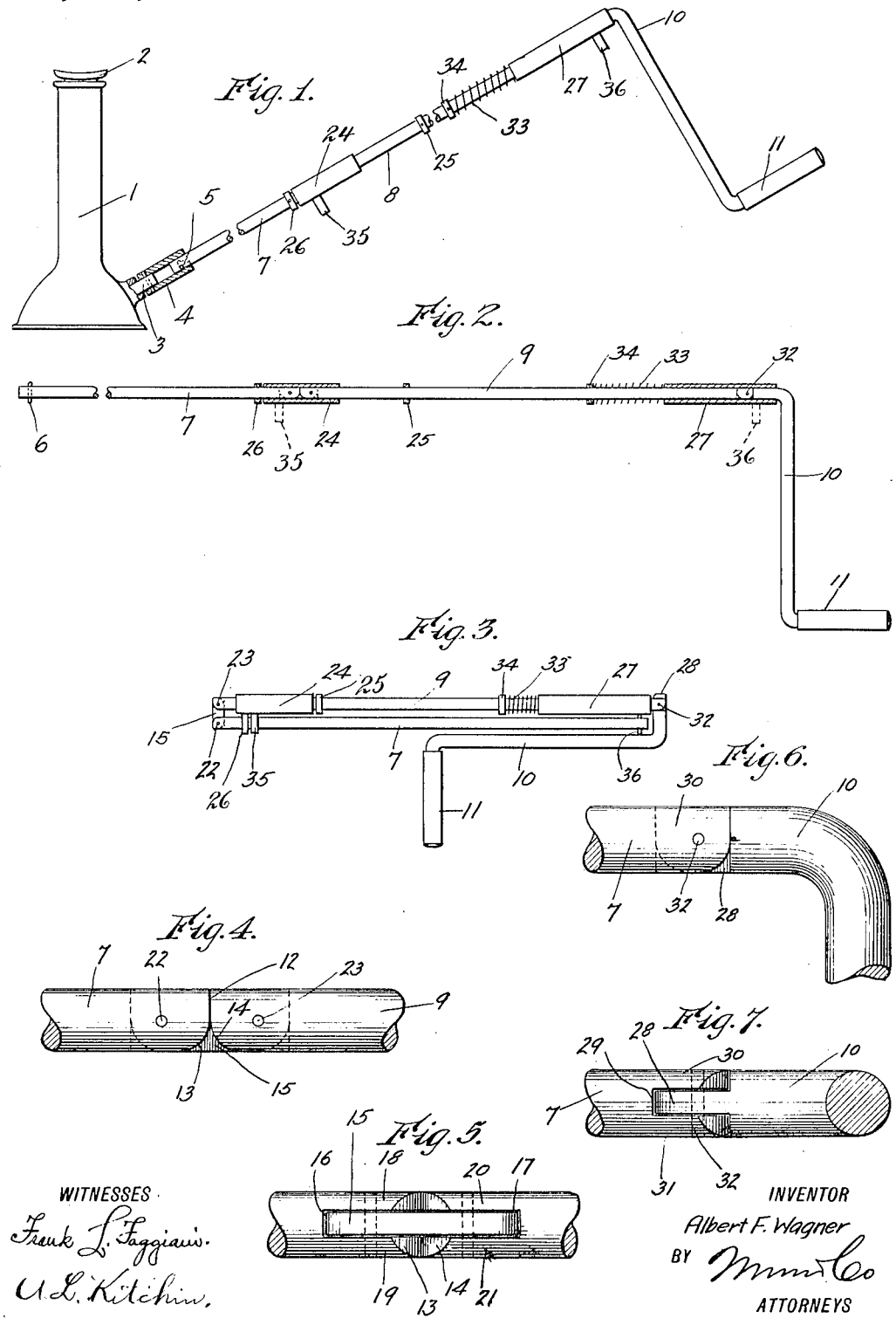

ALBERT FERDENAND WAGNER, OF NEW YORK, N. Y.

JACK-HANDLE.

1,286,161.  Specification of Letters Patent.  Patented Nov. 26, 1918.

Application filed November 28, 1917. Serial No. 204,360.

*To all whom it may concern:*

Be it known that I, ALBERT F. WAGNER, a citizen of the United States, and a resident of the city of New York, borough of Manhattan, in the county and State of New York, have invented a new and Improved Jack-Handle, of which the following is a full, clear, and exact description.

This invention relates to handles for lifting jacks and has for an object the provision of an improved construction which when in operation will properly actuate the jack, but which may be quickly collapsed into a comparatively small space.

Another object in view is to provide a jointed handle with means for locking the same in an elongated position when in use, and the parts may be folded when it is desired to store the handle in a tool box or other receptacle.

In the accompanying drawing:

Figure 1 is a side view of a handle disclosing an embodiment of the invention, same being shown applied.

Fig. 2 is a side view of the handle shown in Fig. 1, certain parts being shown in section for better illustrating the construction.

Fig. 3 is a side view of the handle when it is collapsed or folded.

Fig. 4 is an enlarged side view of the abutting ends of two of the sections of the handle shown in Fig. 2.

Fig. 5 is a bottom plan view of the structure shown in Fig. 4.

Fig. 6 is a detail fragmentary view showing the abutting ends of the crank member and one of the remaining sections of the handle, same being on an enlarged scale.

Fig. 7 is a bottom plan view of the structure shown in Fig. 6.

Referring to the accompanying drawing by numerals, 1 indicates a jack of any desired kind which is provided with a member 2 designed to be elevated when the shaft 3 is rotated in a certain direction and lowered when rotated in the opposite direction. A sleeve 4 is connected in any suitable manner with the shaft 3, said sleeve having an aperture 5 for receiving the ends of the pin 6 on the end section 7 of the handle 8. Handle 8 is provided with sections 7, 9 and 10, section 9 being intermediate while section 10 is formed as a crank provided with a grip 11 if desired. The abutting ends of sections 7 and 9 are formed as shown in Fig. 4, namely with straight sections at the point 12 and curved sections at points 13 and 14 so that the sections may be hinged in one direction and prevented from being hinged in the opposite direction. A link 15 is arranged in slots 16 and 17 formed by the bifurcated arms 18, 19, 20 and 21. Suitable pins 22 and 23 extend through the arms 18 and 19 and also the arms 20 and 21 respectively for connecting the link and the sections 7 and 9. A sleeve 24 is slidingly mounted on the section 19 limiting its movement in one direction by a stop 25 while permitting a sufficient movement to slide over the joint of the sections 7 and 9 as shown in Fig. 2. A stop 26 is arranged on section 7 for limiting the movement of the sleeve 24 toward the end of section 7 carrying pin 6. By the use of these stops, the sleeve is held near the place where it is to be used by one stop and held in position over the joint by the other stop. A sleeve 27 similar to sleeve 24 is arranged at the joint between the sections 9 and 10 said sections being preferably connected together by section 10 having a tongue 28 extending into the slot 29 between the bifurcated arms 30 and 31 of section 9, a suitable pin 32 is used for connecting the parts together while the sleeve 27 holds them in alinement while the device is in use. A spring 33 surrounds section 9 and acts against the stop 34 and against sleeve 27 for causing the sleeve 27 to normally remain in the position shown in Fig. 2, namely over the connection between sections 9 and 10. It is evident that stops 25 and 26 and 34 may be adjusted to any position by set screws or may be held in position in any other desired manner without departing from the spirit of the invention.

When the handle 8 is not to be used, and it is desired to place the same in a tool chest or some other convenient place the parts are folded as shown in Fig. 3. To fold the handle in this manner sleeve 24 is moved over to a position against stop 25 and sleeve 27 is moved against the action of spring 33 until the crank 10 can move over to its folded position. In order to operate the sleeves 24 and 27 to act as a proper support for the section 7 when the parts are folded pins 35 and 36 are rigidly secured in any desired manner to sleeves 24 and 27 as shown in Fig. 3. The sleeve 27 in addition to holding the parts in alinement as shown in Fig.

2 has two other purposes, one for holding the crank 10 in a folded position as shown in Fig. 3 by pressing against the same, and also is adapted to be used as a bearing member when the handle is in operation. When the parts are in the position shown in Fig. 1 the sleeve 27 is gripped by one hand and as the crank is turned around the sleeve remains fixed in the hand and thus acts as a bearing in which the upper end of section 9 and part of the crank 10 rotate.

In regard to sections 7 and 9 it is, of course, understood though only two sections are shown, more sections could be used if desired without departing from the spirit of the invention, and also, if desired, a spring could be used between sections 9 and 10 for automatically forcing the sleeve to the position shown in Fig. 2 when the sections are alined.

What I claim is:

A jack handle comprising a body having a plurality of jointed sections, a sleeve for each of said joints fitting on to said sections and slidable over the joints when the handle is in operation, a crank hinged to one of the end sections of said body, a spring acting on the sleeve fitting over said hinge and holding the sleeve in place so that the same may act as a grip when the crank is rotated, and a pin positioned on each of the sleeves for holding in a limited sense the folded sections in their folded position when not in use.

ALBERT FERDENAND WAGNER.